Dec. 14, 1965       R. E. SCOTT       3,222,975
EXPANSIBLE FASTENER
Filed May 15, 1961

INVENTOR
Robert E. Scott

ATTORNEYS

United States Patent Office 3,222,975
Patented Dec. 14, 1965

3,222,975
EXPANSIBLE FASTENER
Robert E. Scott, 1471 Club Drive, Rte. 3,
Bloomfield Hills, Mich.
Filed May 15, 1961, Ser. No. 110,162
4 Claims. (Cl. 85—37)

This invention relates to fasteners and particularly to a fastener of the compressible head expansible leg type.

The invention contemplates a simple inexpensive one-piece integral fastener device that is readily manufactured and which is easily applied to two members to be secured together and tightened in superposed condition by a conventional tool such as pliers.

In its preferred embodiment the invention will be disclosed as essentially a split hollow leg rivet having a special winged head, but it may take other forms as will appear from the accompanying claims.

It is the major object of the invention to provide a fastener of one-piece simple structure having a special coacting split stud and winged head arrangement of such nature that compression of the head wings expands the stud legs thrust through apertures in two members to be secured together into holding engagement with one of the members and clenches the members between the expanded legs and the underside of the head in the assembly.

These and other objects of this invention will become more fully apparent by reference to the appended claims and as the following detailed description proceeds in reference to the accompanying drawings wherein:

Figure 1:
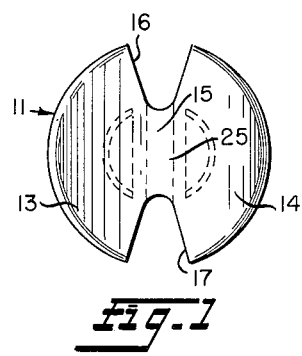
FIGURE 1 is a top plan view of a fastener according to a preferred embodiment of the invention.
Figure 2:
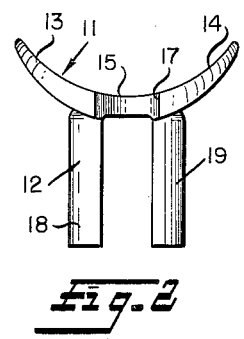
FIGURES 2, 3 and 4 are respectively one side elevation, bottom plan and another side elevation views of the fastener of FIGURE 1.

The fastener of the invention comprises essentially a rivet-like device having a head 11 and a stud 12.

In its relaxed form ready for use as a fastener this device has a head composed of oppositely diverging side wings 13 and 14 which have their central portions connected by a solid bridge 15 at the top of the stud and their outer portions separated by notches 16 and 17.

Figure 3:
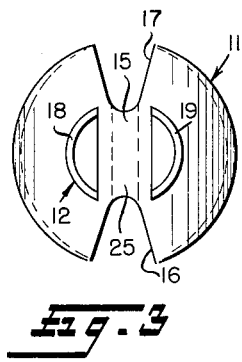
Figure 4:
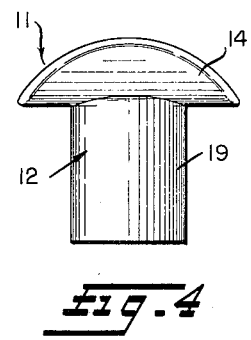

The stud 12 is composed of two legs 18 and 19 which may be of generally arcuate cross-section to better enter circular openings, and these legs project at right angles to bridge 15. Each stud leg, see FIGURE 3, is symmetrically disposed below an associated wing and the top of each stud leg is integrally joined directly to the underside of the head adjacent the juncture of its associated wing with the bridge.

Figure 5:
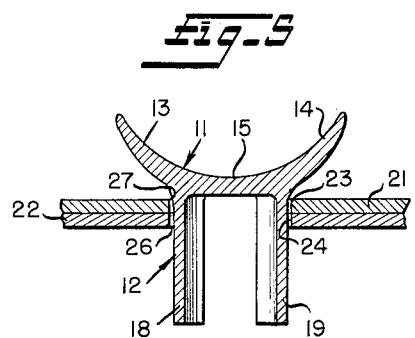
FIGURE 5 is a section showing the fastener as it is inserted into the aligned apertures of two parts to be secured together.
Figure 6:
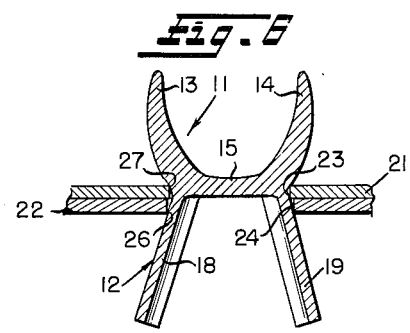
FIGURE 6 is a section that shows the fastener of FIGURE 5 deformed into clamping engagement with the parts.

FIGURES 5 and 6 show how the fastener is used. The members to be secured together, here flat sheet metal members 21 and 22 formed with aligned circular openings 23 and 24 respectively of about the same size, are placed together in superposed relation as in FIGURE 5, and the stud 12 is thrust through the aligned openings. With the parts as in FIGURE 5, plier jaws are applied to the opposite head wings and squeezed, and the wings 13 and 14 oppositely rocked about the same effective pivots located substantially within the dotted line bridge area indicated in FIGURES 1 and 3. At the same time the stud legs 18 and 19 are oppositely rocked about the same effective pivots until as shown in FIGURE 6 the fastener device assumes its operative condition and position in the assembly. This opposite rocking of the wings and stud legs takes place as the bridge metal deforms.

At this time the arcuate outer surfaces of the legs 18 and 19 have come into tight contact with the lower edge 26 of the aperture 24 in lower member 22, and the upper edge 27 of the aperture 23 in the upper member 21 is urged into tight contact with the undersides of the head wings.

Thus the two members 21 and 22 are tightly clamped together axially of the fastener in superposed relation, with their respective aperture edges tightly engaged with the outer sides of the legs 18, 19 and the under sides of the wings 13, 14 respectively.

The fastener may be integrally made of any material such as steel, aluminum or even a hand plastic capable of holding a deformed condition. Preferably as a practical matter the starting device may be a flat headed hollow stud rivet, which can have the head notched and bent to provide the above disclosed wing arrangement, and stud split to provide the associated dual leg structure.

Figure 7:
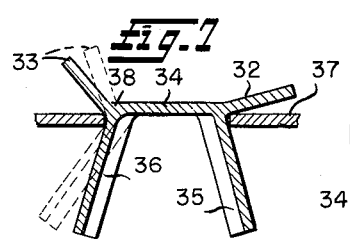
FIGURE 7 is a section showing another embodiment of the invention wherein only one movable wing and one movable fastener leg are involved.
Figure 8:
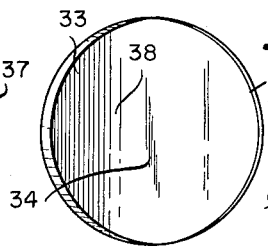
FIGURE 8 is a top plan view of the fastener of FIGURE 7.

In FIGURES 7 and 8 the fastener 31 is of special form having one head wing 32 substantially flat and the other wing 33 inclined upwardly at an angle to the head bridge 34. Here the diverging leg 35 is disposed below wing 32 and the leg 36 is disposed below wing 33.

Here with the stud legs thrust through the circular aperture in plate 37, as shown in FIGURE 7, the single wing 33 can be rocked about the effective hinge region 38 to the dotted line position of FIGURE 7, wing 32 and leg 35 remaining effectively stationary. It will be seen that the fastener will probably shift slightly to the right in FIGURE 7 so that the left edge of the aperture will be tight between wing 32 and leg 35, and at the other side of the aperture the plate will be gripped between arm 33 and leg 36.

Also it will be observed from FIGURE 8 that the head need not be notched between wings, and the same is true for the head structures of FIGURES 1 and 3. The notches merely make the wing pivoting easier.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A one-piece integral fastener consisting of a head and a stud projecting from the bottom of said head, said head comprising a solid bridge section containing the stud axis at the top of the stud and wings extending from opposite sides of said bridge section, at least one of said wings extending angularly upwardly from said bridge section, and said stud comprising spaced legs projecting down from said head with one leg on each side of the stud axis and axially associated with one of said wings, the top of each stud leg being integrally joined directly to the underside of said head adjacent the juncture of its associated wing with said bridge, whereby when said wings are relatively oppositely rocked toward each other the head material at said bridge section between an associated stud leg and head wing deforms to relatively oppositely rock said legs to correspondingly diverge with respect to said head.

2. A one-piece integral fastener consisting of a head and a stud projecting from the bottom of said head, said head comprising a solid bridge section extending transversely of and containing the stud axis at the top of the stud and wings oppositely upwardly diverging from opposite sides of said bridge section, said head having diametrically opposite notches peripherally separating said wings, said stud comprising spaced substantially straight legs projecting down from said head with at least one leg on each side of the stud axis and axially associated with one of said wings, the top of each stud leg being integrally joined directly to the underside of said head adjacent the juncture of its associated wing with said bridge, whereby when said wings are oppositely rocked toward each other the head material at said bridge section between each associated stud leg and head wing deforms to oppositely rock said legs to correspondingly diverge with respect to said head.

3. A one-piece integral fastener consisting of a head and a stud projecting from the bottom of said head, said head comprising a solid bridge section containing the stud axis at the top of the stud and wings oppositely extending from opposite sides of said bridge section, one of said wings being substantially in the plane of the head bridge and the other being inclined upwardly and outwardly from said bridge section, and said stud comprising two spaced legs projecting down from said head with one leg on each side of the stud axis and axially associated with one of said wings, the top of each stud leg being integrally joined directly to the underside of said head adjacent the juncture of its associated wing with said bridge, whereby when said wings are relatively oppositely rocked toward each other the head material at said bridge section between said inclined head wing and associated leg deforms to oppositely relatively rock said legs to correspondingly diverge with respect to said head.

4. In combination, two flat surfaced members adapted to be secured together in superposed relation and formed with aligned apertures of about the same size, a one-piece integral fastener consisting of a head and a stud projecting from the bottom side of said head, said head comprising a bridge section extending transversely of and containing the stud axis and wings oppositely upwardly diverging from opposite sides of said bridge section, said stud beng thrust through said apertures from one side thereof until the undersides of said wings engage the upper peripheral edge of the aperture in the uppermost member, said stud comprising spaced substantially straight legs projecting downwardly from said head with at least one leg being on each side of the stud axis and axially associated with one of said wings, each of said legs being joined to the underside of said head along the juncture of its associated wing with said bridge such that said bridge extends transversely between said legs, said stud legs being oppositely rocked about a pivot region adjacent said head to final permanent diverging relation by opposite rocking of said wings toward each other until said legs engage only the lower peripheral edge of the aperture in the lowermost member to tightly clamp said members in superposed assembly between the outer surfaces of said diverging legs and the undersides of said wings.

References Cited by the Examiner
UNITED STATES PATENTS

| | | | |
|---|---|---|---|
| 2,618,193 | 11/1952 | Peckham | 85—38 |
| 2,783,514 | 3/1957 | Franz. | |
| 2,875,487 | 3/1959 | Holton. | |
| 2,995,789 | 8/1961 | Holton | 85—5 |

EDWARD C. ALLEN, *Primary Examiner*.

CARL W. TOMLIN, *Examiner*.